United States Patent
Veillette et al.

(10) Patent No.: US 6,864,634 B2
(45) Date of Patent: Mar. 8, 2005

(54) METHOD AND SYSTEM FOR TRANSMITTING AND DISPLAYING INFORMATION ON A WIRELESS DEVICE USING PLASTIC ELECTRONICS

(75) Inventors: Benoit R. Veillette, Shrub Oak, NY (US); Ling Wang, Millwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/135,346

(22) Filed: Apr. 30, 2002

(65) Prior Publication Data

US 2003/0201721 A1 Oct. 30, 2003

(51) Int. Cl.[7] .............................................. H01K 1/62
(52) U.S. Cl. ................... 315/33; 315/169.3; 315/86; 235/472
(58) Field of Search ........................ 315/33, 86, 169.3; 235/472, 455; 710/65; 345/21; 359/143, 144, 152, 154, 157, 135, 155, 189; 364/514 R; 348/164, 764

(56) References Cited

U.S. PATENT DOCUMENTS

| | | | |
|---|---|---|---|
| 5,193,201 A | | 3/1993 | Tymes |
| 5,364,108 A | * | 11/1994 | Esnouf ............................ 463/9 |
| 5,588,009 A | * | 12/1996 | Will ............................ 714/749 |
| 5,629,868 A | * | 5/1997 | Tessier et al. ............... 348/164 |
| 5,744,791 A | * | 4/1998 | Isaac et al. ............. 235/472.01 |
| 5,818,617 A | * | 10/1998 | Shipley ....................... 359/135 |
| 6,021,119 A | * | 2/2000 | Derks et al. ................. 370/261 |
| 6,263,503 B1 | * | 7/2001 | Margulis ....................... 725/81 |
| 6,445,369 B1 | * | 9/2002 | Yang et al. .................... 345/82 |
| 2002/0049978 A1 | * | 4/2002 | Rodriguez et al. ............ 725/86 |

FOREIGN PATENT DOCUMENTS

| | | | | |
|---|---|---|---|---|
| DE | 4403696 | 8/1995 | | G09G/3/00 |
| EP | 0456462 | 11/1991 | | G07G/1/00 |
| WO | WO9802846 | 1/1998 | | G06K/17/00 |
| WO | WO9953633 | 10/1999 | | H04B/10/10 |
| WO | WO0030415 | 5/2000 | | H05B/41/38 |

* cited by examiner

*Primary Examiner*—Don Wong
*Assistant Examiner*—Chuc Tran

(57) ABSTRACT

The present invention provides a structure, method, computer program and a system for displaying information on a portable wireless device. This may be accomplished by receiving a light signal containing embedded data and converting the signal into electrical power. It may also be accomplished by demodulating the embedded data, retrieving information from the database in the storage device and displaying the information on a Light Emitting Polymer display screen.

20 Claims, 3 Drawing Sheets

300

METHOD AND SYSTEM FOR TRANSMITTING AND DISPLAYING INFORMATION ON A WIRELESS DEVICE USING PLASTIC ELECTRONICS

FIELD OF THE INVENTION

This invention relates generally to using large area electronics and lighting systems. Specifically, it relates to a method of displaying information on a wireless device.

BACKGROUND OF THE INVENTION

Often it is desirable to broadcast information to a large dispersed audience or in a high traffic area, for example a large department store. This is commonly accomplished using wireless communication systems. Many of the wireless systems that exist today are complex systems and contain receiver terminals that operate on either Radio Frequency (RF) or infrared light. This equipment typically requires a separate power supply, which increases the overall system cost. This makes the equipment less desirable for large-scale deployment.

It would be desirable therefore to provide a system that overcomes the above disadvantages to provide a low cost device for displaying information using plastic electronics.

SUMMARY OF THE INVENTION

One aspect of the present invention provides a structure for displaying information on a portable wireless device that includes a power conversion unit and a central control unit operably connected to the power supply unit. It may also include a light detection/demodulation unit operably connected to the central control unit, a data storage device and a display unit operably connected to the central control unit.

Another aspect of the present invention provides a system for displaying information on a portable wireless device. The system may include means for receiving a light signal and converting the signal into electrical power. It may also include means for demodulating the data embedded in the light signal. It may also include means for retrieving an information message from the database in the storage device and displaying the information on a display unit.

Another aspect of the present invention provides a method for displaying information on a portable wireless device. A light signal is received and converted into electrical power. Data, which is embedded in the light signal is demodulated. An information message is retrieved from a data storage device and the information is displayed on a Light Emitting Polymer display device.

DETAILED DESCRIPTION OF THE PRESENTLY PREFERRED EMBODIMENTS

Figure 1:
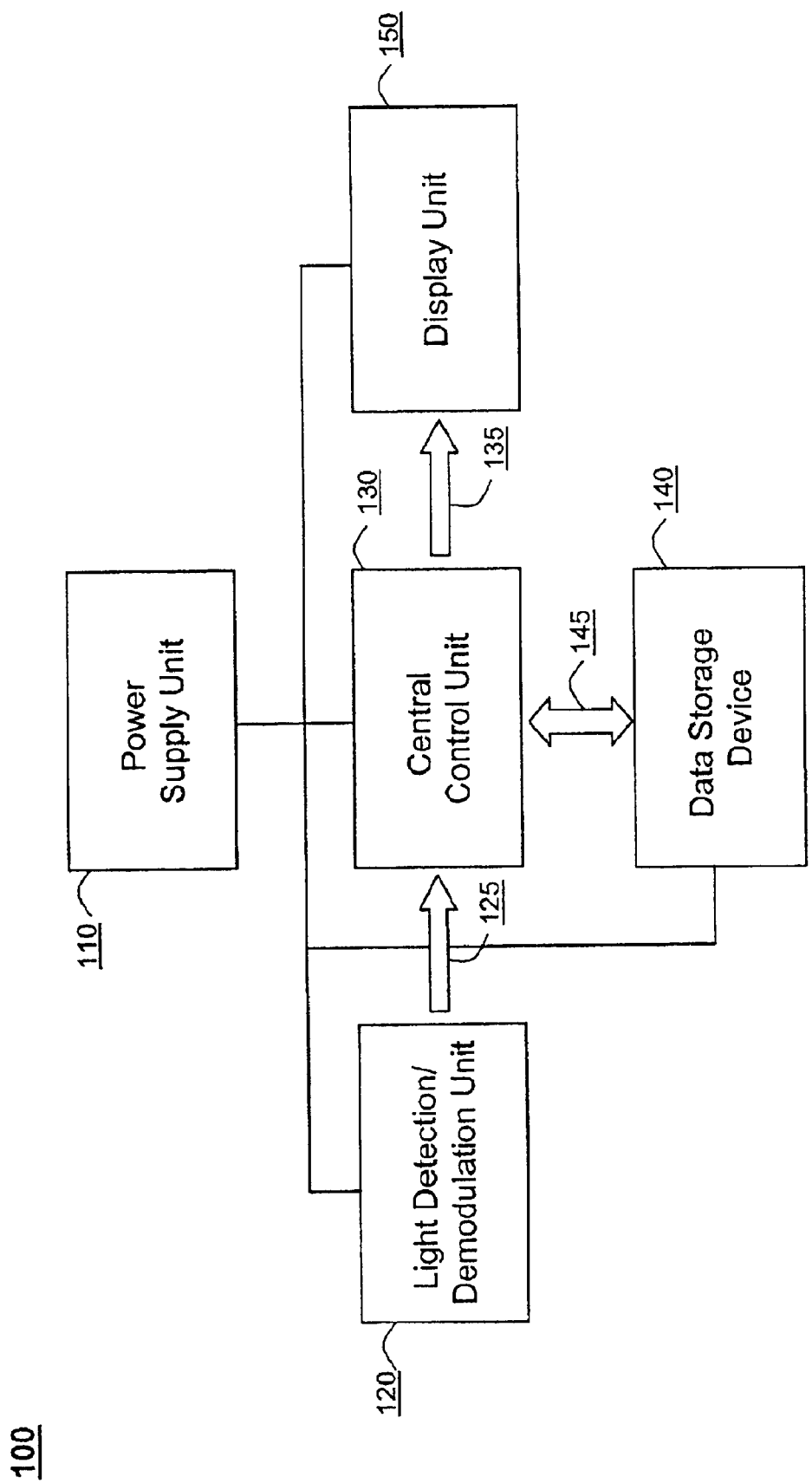
FIG. 1 is a schematic diagram of one embodiment of a system for displaying information on a portable wireless device in accordance with the present invention.

FIG. 1 shows one embodiment of a system for displaying information on a portable wireless device in accordance with the present invention at 100. The system may include a power conversion unit 110, a light detection/demodulation unit 120, a central control unit 130, a data storage device 140 and a display unit including associated driver circuitry 150. The devices 110, 120, 130, 140, 150 may be operably connected using wires, fiber optic connectors or any other suitable means known in the art.

The power conversion unit 110 may receive a light signal from any light source 105. The source 105 of light may be natural or artificial. For example, the light may be fluorescent light used in a large department store, morning sunlight or any other type of light known in the art.

In one embodiment, embedding data in the output of the florescent lamp and transmitting the data over the modulated light signal may be achieved by one of various modulation methods known in the art. This data may be a digital character string and may include instructions on retrieving information from a database in storage. The light signal may be received by the power conversion unit 110 and may be converted to electrical power by any light conversion device 111 known in the art. In one embodiment the light conversion device 111 may be a solar cell.

This electrical power maybe used to provide electrical power to the demodulation unit 120 which may include a photodiode, a photoconductor or any other photo detecting device known in the art, the central control unit 130, which may be any suitable hardware or software, or combination of hardware and software, the display 150 and the storage device 140. A portion of this electrical power may be stored in at least one battery 112 or capacitor 113 that is part of the power conversion unit 110. The stored electrical power in the battery 112 or capacitor 113 may provide back-up power capacity to prevent system outage due to short-term reduction in the light power received. For example, if the fluorescent lights were to be shut off or dimmed, the back up power may be released to the system until the light source 105 came back on or until the back-up capacity became exhausted.

Upon powering on the system, the light detection/demodulation unit 120 begins an initialization sequence and begins to check for any incoming light sources. The light detection/demodulation unit 120 may detect the light source and may receive the light signal. The data, embedded in the light signal, may be detected and demodulated by the light detection/demodulation unit 120. In this embodiment this demodulated data may be instructions 125 for the central control unit 130 to retrieve an information message 145 from the data storage device 140. This retrieved information message 135 may be sent to the display unit 150 where it may be displayed. For example, in one embodiment, the information message could be directions to locate an item currently on sale in the department store.

Figure 2:
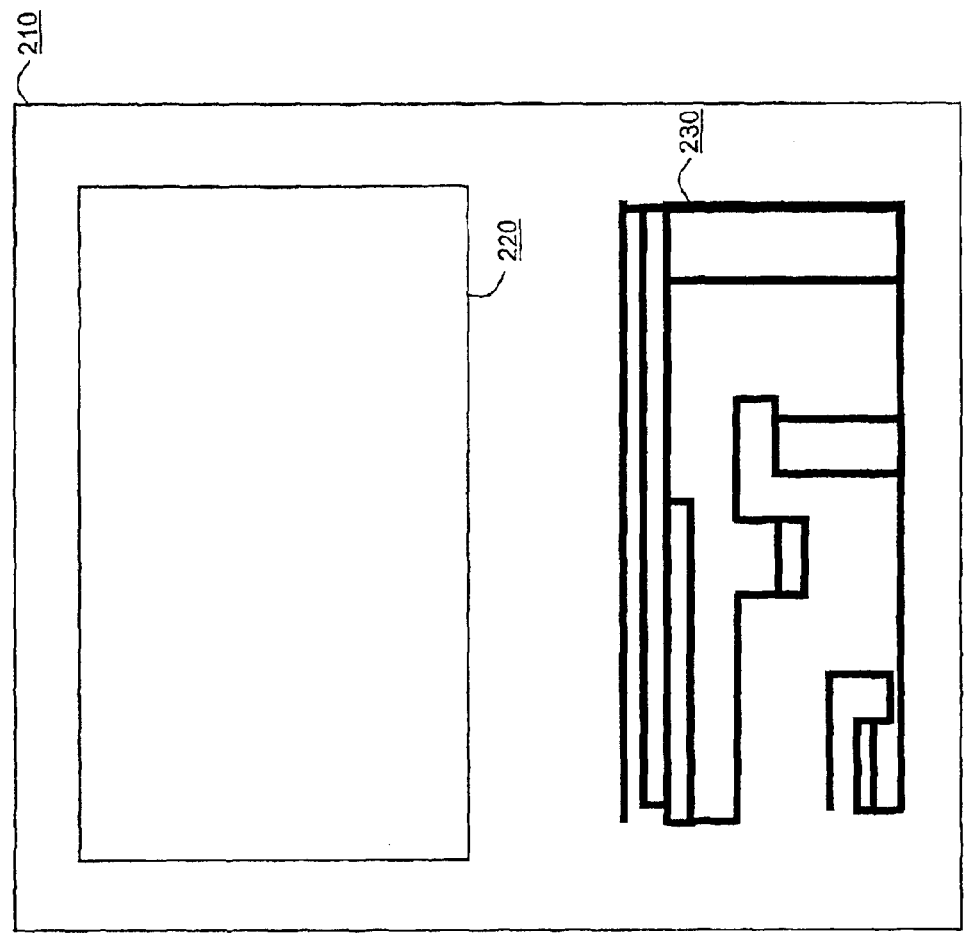
FIG. 2 is a schematic diagram of one embodiment of a portable video reception device of system for displaying information on a portable wireless device in accordance with the present invention.

FIG. 2 shows one embodiment of a portable video reception device of a system for displaying information on a portable wireless device in accordance with the present invention at 200. The portable wireless device may include a plastic substrate 210, at least one display screen 220 and printable display driver circuits 230. The plastic substrate 210 may be a flexible material designed and manufactured using a method known in the art. For example, the plastic substrate may use plastic transistors or any other means known in the art. The printable circuits 230 may be manufactured directly onto the plastic substrate 210 by any method known in the art, and the display screen 220 may be manufactured using Light Emitting Polymers by a method known in the art. As electric current is applied to the printable display driver circuits 230, the display illuminates and the information transmitted via the printable display driver circuits 230 is displayed on the Light Emitting Polymer display screen 220.

Figure 3:
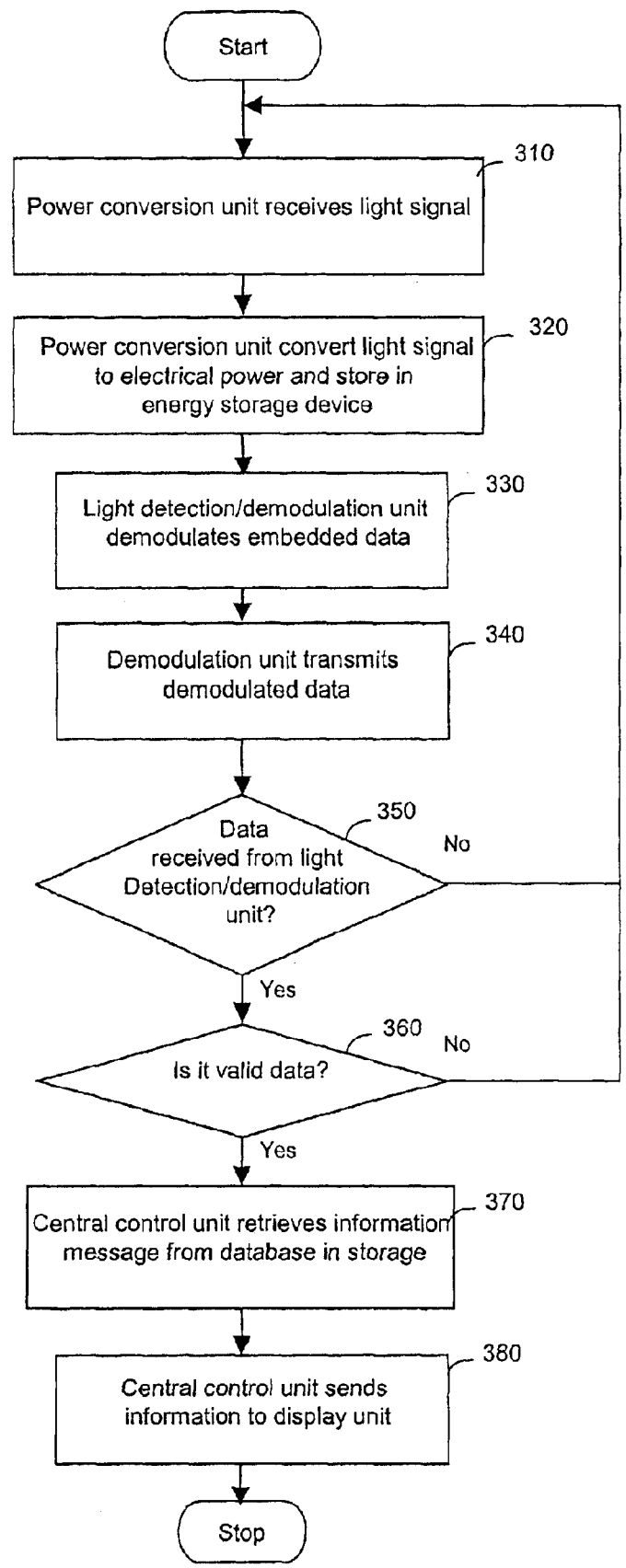
FIG. 3 is a flow diagram of one embodiment of a method for controlling a system for displaying information on a portable wireless device in accordance with the present invention.

FIG. 3 shows a flow diagram of one embodiment of a method for controlling a system for displaying information on a portable wireless device in accordance with the present invention at 300. Upon powering on the system, the power conversion unit 110 may search for and receive a transmitted light signal (Block 310). This light signal may be any type of light known in the art. For example, it may be a fluorescent light like those that are used in department stores or it may be sunlight shining through a window. The power conversion unit 110 may convert the light signal to an electric power by any means known in the art (Block 320) and may store the electric power in an energy storage device located on the power conversion unit. The light detection/demodulation unit 120 may continually look for a light signal. This activity may be a continuous process or may be accomplished by periodic "looks" to see if light has been transmitted. In one embodiment, when the system is initialized, (i.e. when power is applied to it), the light detection/demodulation unit 120 is actuated and light detection is achieved. Once the light is detected the light detection/demodulation unit 120 demodulates the data embedded in the light signal (Block 330) and sends the demodulated data to the central control unit 130 (Block 340). The central control unit 130, may be configured to determine if the demodulated data has been received from the light detection/demodulation unit 120. If the data has been received the central control unit 130 determines if the data is valid (Block 360). Data validity may be based on the data format, the length or any other characteristic that is known in the art. For example, the data format may be an ASCII character string or another digital or binary format. In one embodiment, the data may be instructions to retrieve an information message from the database in the storage device 140. If it is determined that the message is valid, the central control unit may retrieve the information message from the data storage device 140 (Block 370). The information message that may have been retrieved from the database storage may be any type of message, text based, graphics or any other type of information message. In this embodiment, the information message may be physical location directions for items in the department store. This information may be sent to the display unit 220 to be displayed on the display unit screen 220 (Block 380).

As described above, the system for displaying information on a portable wireless device provides a number of advantages, some of which have been described above and others of which are inherent in the invention. Also, modifications may be proposed without departing from the teachings herein. Accordingly, the scope of the invention is only to be limited as necessitated by the accompanying claims.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A structure for displaying information on a portable wireless device, comprising:
    a power conversion unit operable to receive and convert a light signal containing embedded data into electrical power;
    a central control unit operably connected to the power conversion unit;
    a light demodulation unit operably connected to the central control unit, the light demodulation unit operable to demodulate the light signal using the electrical power;
    a database storage device operably connected to the central control unit; and
    a display unit operably connected to the central control unit.

2. The structure of claim 1, wherein the power conversion unit includes at least one light conversion device operable to receive and convert the light signal into electrical power.

3. The structure of claim 2, wherein the light conversion device is a solar cell.

4. The structure of claim 1, wherein the power conversion unit includes at least one energy storage device.

5. The structure of claim 4, wherein the energy storage device includes at least one of: at least one capacitor and at least one battery.

6. The structure of claim 1, wherein the central control unit controls the light demodulation unit, the database storage device, and the display unit.

7. The structure of claim 1, wherein the light detection/demodulation unit includes a light receiver device and a signal demodulator device.

8. The structure of claim 1, wherein the display unit includes at least one Light Emitting Polymer display screen and at least one associated driver circuit.

9. A method for displaying information on a portable wireless device, comprising:
    receiving a light signal containing embedded data;
    converting the signal into electrical power;
    demodulating the embedded data using the electrical power;
    retrieving information from a database in a storage device in response to the embedded data; and
    displaying the information on a display unit.

10. The method of claim 9, further comprising storing the electrical power.

11. The method of claim 10, wherein the electrical power is stored in a battery.

12. The method of claim 10, wherein the electrical power is stored in a capacitor.

13. The method of claim 9, wherein the light signal is converted into a direct current power signal.

14. The method of claim 9, wherein the embedded data includes data retrieval instructions.

15. The method of claim 9, wherein retrieving information from the storage device further comprises validating information format.

16. The method of claim 9, wherein displaying information on the display unit further comprises sending information to a display driver and a display screen.

17. A system for displaying information on a portable wireless device, comprising:

means for receiving a light signal containing embedded data;

means for converting the signal into electrical power;

means for demodulating the embedded data using the electrical power;

means for retrieving information from a database in a storage device in response to the light signal containing embedded data; and means for displaying information on the display screen.

18. The system of claim 17, further comprising means for storing the electrical power.

19. A computer program embodied on a computer readable medium and operable to be executed by a processor for displaying information on a portable wireless device, the computer program comprising:

program code operable to cause the portable wireless device to receive a light signal modulated with data;

program code operable to cause the portable wireless device to convert the light signal into electrical power;

program code operable to cause the portable wireless device to demodulate the data using the electrical power;

program code operable to cause the portable wireless device to retrieve information from a data storage device in response to the light signal; and program code operable to cause the portable wireless device to display the information on a display unit.

20. The computer program of claim 19, further comprising program code operable to control storage of the electrical power.

\* \* \* \* \*